३,२९९,०३२
PROCESS FOR TREATING POLYBUTADIENE WITH SULFURIC ACID TO IMPROVE COLD FLOW
Kent W. Rollmann, Bartlesville, Okla., assignor to Phillips Petroleum Company, a corporation of Delaware
No Drawing. Filed Oct. 8, 1962, Ser. No. 229,223
7 Claims. (Cl. 260—94.7)

This invention relates to a method for preventing or substantially reducing the tendency of certain polybutadienes to cold flow. In one aspect, it relates to the improved polybutadiene obtained when using the method to treat the polymer.

In recent years a great deal of research work has been directed toward the production of improved rubbery polymers. One of the products that has attracted wide-spread attention because of its superior properties is a polybutadiene containing a high percentage, e.g., at least 85 percent, of cis-1,4-addition. Another polymer that has achieved considerable importance is a polybutadiene prepared by polymerizing 1,3-butadiene with an organolithium catalyst. The physical properties of these polymers are of such a nature that they are particularly suitable for the fabrication of automobile and truck tires and other articles for which conventional synthetic polymers have heretofore been comparatively unsatisfactory. However, in the processing of the polymers, particularly in packaging, shipping and storage, a certain amount of difficulty has been experienced because of the tendency of the polymers to cold flow when in the unvulcanized state. For example, if cracks or punctures develop in the packages used in storing the polymers, polymer will flow from the packages with a resulting loss or contamination and sticking together of stacked packages.

It is an object of this invention, therefore, to provide a method for eliminating or substantially reducing the tendency of cis-polybutadiene and organolithium-catalyzed polybutadiene to cold flow when in the unvulcanized state.

Another object of the invention is to provide a method for producing a cis-polybutadiene and an organolithium-catalyzed polybutadiene so as to provide products which have a reduced tendency to cold flow.

Another object of the invention is to provide a method for terminating the polymerization reaction in which polybutadiene is produced so as to obtain a polymer product which has a reduced tendency to cold flow.

Still another object of the invention is to provide an improved polybutadiene which does not have a tendency to cold flow when in the unvulcanized state.

Other and further objects and advantages of the invention will become apparent to those skilled in the art upon consideration of the accompanying disclosure.

The present invention is concerned with the production of improved polybutadiene products in which the tendency to cold flow is eliminated or substantially reduced. The invention resides in the discovery that the tendency of a polybutadiene to cold flow in the unvulcanized state can be eliminated or greatly reduced if the polymer dissolved in a hydrocarbon solvent is treated with concentrated sulfuric acid dispersed in a hydrocarbon. A commercially available concentrated sulfuric acid having a concentration of at least about 95 weight percent, e.g., in the range of 95 to 98 percent, is usually employed in the practice of the invention. However, sulfuric acids having a lower concentration, e.g., in the neighborhood of 80 weight percent, can be used without departing from the spirit and scope of the invention. It is preferred to use the sulfuric acids having the higher concentrations since the greatest reductions in cold flow are thereby obtained. It was completely unexpected when it was found that the tendency of a polybutadiene to cold flow could be eliminated by treating the polymer with concentrated sulfuric acid dispersed in a hydrocarbon. The treatment of polymer solutions with dilute sulfuric acid to remove catalyst residues had been previously suggested. However, when dilute sulfuric acid is used to treat a solution of polybutadiene, there is substantially no change in the tendency of the polymer to cold flow.

In carrying out the method of this invention, the polybutadiene to be treated is dissolved in a hydrocarbon solvent, such as an aliphatic, cycloaliphatic or aromatic hydrocarbon. The polymer solutions usually have a concentration in the range of 5 to 20 weight percent although more dilute or concentrated solutions can be used. Examples of suitable solvents are disclosed hereinafter in the description of the processes used in preparing the polybutadiene. The concentrated sulfuric acid used as the treating agent is dispersed in the hydrocarbon and then added slowly with rapid stirring to the polymer solution. The hydrocarbon used to disperse the sulfuric acid is generally the same as that used as the solvent for the polymer. However, it is to be understood that it is within the scope of the invention to employ different hydrocarbons. Rapid stirring is continued for the duration of the treatment in order to ensure intimate contact of the polymer with the acid. Substantially complete reduction in cold flow is readily obtained without degradation of the polymer by proceeding in the described manner. The temperature employed for the treatment is ordinarily in the range of 30 to 150° C., preferably in the range of 50 to 125° C. The time required for reducing the cold flow to a desired level will depend at least to a certain degree on the temperature used. However, the period is generally in the range of 10 minutes to 5 hours. While the treating method can be carried out in an atmosphere of air, it is preferred to use an inert atmosphere, such as nitrogen, in order to eliminate any tendency toward oxidative scission.

The quantity of sulfuric acid employed is generally in the range of 0.2 to 5 parts by weight per 100 parts by weight of rubber. The concentration of the sulfuric acid in the hydrocarbon is usually in the range of 1 to 25 percent by weight, preferably 5 to 15 weight percent.

In one embodiment, the present invention resides in an improvement in the process for polymerizing 1,3-butadiene with a catalyst system selected from the group consisting of (1) an iodine-containing catalyst including an organometal and a titanium halide, and (2) an organolithium catalyst. The improvement comprises the step of adding to the polymerization mixture concentrated sulfuric acid dispersed in a hydrocarbon. The addition of the dispersion of concentrated sulfuric acid to the polymerization reaction mixture results in the inactivation of the catalyst and termination of the polymerization reaction. When polymerizing butadiene with an organometal-type catalyst, the reaction is normally terminated or shortstopped when the conversion has reached a desired level by the addition of a catalyst-inactivating agent. Compounds that have been used in this manner include a variety of materials, such as water, alcohol and rosin acids. These materials are effective shortstopping agents, but the product produced has a tendency to cold flow when in the unvulcanized state. The treating agent of this invention, on the other hand, in addition to functioning as an effective shortstopping agent, also makes it possible to obtain a polybutadiene product having a reduced tendency to cold flow. Furthermore, the valuable properties characteristic of cis-polybutadiene and organolithium-catalyzed polybutadiene vulcanizates are retained by proceeding in accordance with the present invention. However, it is to be understood that it is within the scope of the invention to terminate the polymerization reaction with another reagent, such as isopropyl alcohol, after which the reaction mixture can then be treated with concentrated sulfuric acid dispersed in a hydrocarbon.

After treatment of the polybutadiene with the concentrated sulfuric acid, the mixture is then treated to neutralize the acid. This is usually accomplished by cooling the reaction mixture, e.g., to about room temperature, and then washing with an aqueous solution of an alkaline treating agent. Suitable alkaline treating agents include alkali metal hydroxides, carbonates and bicarbonates, ammoium carbonate and bicarbonate, aqueous ammonia, and the like. The polymer is then recovered by conventional methods, such as steam stripping, alcohol coagulation or the like.

After being treated by the method of this invention, the polymers can then be packaged and stored or transferred for utilization elsewhere. The polymer can be blended, compounded, fabricated and cured according to procedures which are well known in the rubber art. While the present invention is not dependent upon any particular reaction mechanism, the concentrated sulfuric acid must be dispersed in a hydrocarbon and intimately contacted with the polybutadiene to be treated.

The treating agent of this invention, i.e., concentrated sulfuric acid dispersed in a hydrocarbon, is applicable generally to polybutadienes having a tendency to cold flow when in the unvulcanized state. The treating agent is particularly applicable to polybutadienes containing a high percentage of cis 1,4-addition and to the processes for preparing such products. The cis-polybutadiene can be prepared by polymerizing butadiene with a catalyst system which includes an organometal compound and iodine, present either in the free or combined state. This polymerization system produces a cis-polybutadiene having outstanding properties when in the cured state but having a tendency to cold flow in the unvulcanized state. The term "cis-polybutadiene" as used herein is intended to include a polybutadiene containing at least 85 percent cis 1,4-addition, e.g., from 85 to 98 percent and higher.

The cis-polybutadienes can be prepared by polymerizing 1,3-butadiene with any one of a large number of different stereospecific catalyst systems. It is usually preferred to employ a catalyst which is selected from the group consisting of (1) a catalyst comprising an organometal compound having the formula $R_mM$, wherein R is an alkyl, cycloalkyl, aryl, alkaryl, aralkyl, alkylcycloalkyl, cycloalkylalkyl, arylcycloalkyl or cycloalkylaryl radical, M is aluminum, mercury, zinc, beryllium, cadmium, magnesium, sodium or potassium, and $m$ is equal to the valence of the metal M, and titanium tetraiodide, (2) a catalyst comprising an organometal compound having the formula $R_nM'$, wherein R is an organo radical as defined above, M' is aluminum, magnesium, lead, sodium or potassium, and $n$ is equal to the valence of the metal M', titanium tetrachloride and titanium tetraiodide, (3) a catalyst comprising an organometal compound having the formula $R_aM''$, wherein R is an organo radical as defined above, M'' is aluminum or magnesium and $a$ is equal to the valence of the metal M'', a compound having the formula $TiX_b$, wherein X is chlorine or bromine and $b$ is an integer from 2 to 4, inclusive, and elemental iodine, (4) a catalyst comprising an organometal compound having the formula $R_xM'''$, wherein R is an organo radical as defined above, M''' is aluminum, gallium, indium or thallium, and $x$ is equal to the valence of the metal M''', a titanium halide having the formula $TiX_4$, wherein X is chlorine or bromine, and an inorganic halide having the formula $M^{iv}I_c$, wherein $M^{iv}$ is beryllium, zinc, cadmium, aluminum, gallium, indium, thallium, silicon, germanium, tin, lead, phosphorus, antimony, arsenic, and bismuth, and $c$ is an integer from 2 to 5 inclusive, and (5) a catalyst comprising an organo compound having the formula $R_xM'''$, wherein R, M''' and $x$ are as defined above, titanium tetraiodide, and an inorganic halide having the formula $M^vX_d$, wherein $M^v$ is aluminum, gallium, indium, thallium, germanium, tin, lead, phosphorus, antimony, arsenic or bismuth, X is chlorine or bromine, and $d$ is an integer from 2 to 5, inclusive. The R radicals of the aforementioned formulas preferably contain up to and including 20 carbon atoms.

The following are examples of preferred catalyst systems which can be used to polymerize 1,3-butadiene to a cis 1,4-polybutadiene: triisobutylaluminum and titanium tetraiodide; triethylaluminum and titanium tetraiodide; triisobutylaluminum, titanium tetrachloride and titanium tetraiodide; triethylaluminum, titanium tetrachloride and titanium tetraiodide; diethylzinc and titanium tetraiodide; dibutylmercury and titanium tetraiodide; triisobutylaluminum, titanium tetrachloride and iodine; triethylaluminum, titanium tetrabromide and iodine; n-amylsodium and titanium tetraiodide; phenylsodium and titanium tetraiodide; n-butylpotassium and titanium tetraiodide; phenylpotassium and titanium tetraiodide; n-amylsodium, titanium tetrachloride and titanium tetraiodide; triphenylaluminum and titanium tetraiodide; triphenylaluminum, titanium tetraiodide and titanium tetrachloride; triphenylaluminum, titanium tetrachloride and iodine; tri-alpha-naphthylaluminum, titanium tetrachloride and iodine; tribenzylaluminum, titanium tetrabromide and iodine; diphenylzinc and titanium tetraiodide; di-2-tolylmercury and titanium tetraiodide; tricyclohexylaluminum, titanium tetrachloride and titanium tetraiodide; ethylcyclopentylzinc and titanium tetraiodide; tri(3-isobutylcyclohexyl)aluminum and titanium tetraiodide; tetraethyllead, titanium tetrachloride and titanium tetraiodide; trimethylphenyllead, titanium tetrachloride and titanium tetraiodide; diphenylmagnesium and titanium tetraiodide; di-n-propylmagnesium, titanium tetrachloride and titanium tetraiodide; dimethylmagnesium, titanium tetrachloride and iodine; diphenylmagnesium, titanium tetrabromide and iodine; methylethylmagnesium, and titanium tetraiodide; dibutylberyllium and titanium tetraiodide; diethylcadmium and titanium tetraiodide; diisopropylcadmium and titanium tetraiodide; triisobutylaluminum, titanium tetrachloride, and antimony triiodide; triisobutylaluminum, titanium tetrachloride and aluminum triiodide; triisobutylaluminum, titanium tetrabromide, and aluminum triiodide; triethylaluminum, titanium tetrachloride and phosphorus triiodide; tri-n-dodecylaluminum, titanium tetrachloride, and tin tetraiodide; triethylgallium, titanium tetrabromide, and aluminum triiodide; tri-n-butylaluminum, titanium tetrachloride, and antimony triiodide; tricyclopentylaluminum, titanium tetrachloride, and silicon tetraiodide; triphenylaluminum, titanium tetrachloride, and gallium triiodide; triisobutylaluminum, titanium tetraiodide and tin tetrachloride; triisobutylaluminum, titanium tetraiodide and antimony trichloride; triisobutylaluminum, titanium tetraiodide and aluminum trichloride; triisobutylaluminum, titanium tetraiodide, and tin tetrabromide; triethylgallium, titanium tetraiodide, and aluminum tribromide; triethylaluminum, titanium tetraiodide, and arsenic trichloride; and tribenzylaluminum, titanium tetraiodide, and germanium tetrachloride.

The polymerization process for preparing cis-polybutadiene is carried out in the presence of a hydrocarbon diluent which is not deleterious to the catalyst system. Examples of suitable diluents include aromatic, paraffinic, and cycloparaffinic hydrocarbons, it being understood that mixtures of these materials can also be used. Specific examples of hydrocarbon diluents include benzene, toluene, n-butane, isobutane, n-pentane, isooctane, n-dodecane, cyclopentane, cyclohexane, methylcyclohexane, and the like. It is often preferred to employ aromatic hydrocarbons as the diluent.

The amount of the catalyst used in preparing the cis-polybutadiene product can vary over a rather wide range. The amount of the organometal used in the catalyst composition is usually in the range of 0.75 to 20 mols per mol of the halogen-containing component, i.e., a metal halide with or without a second metal halide or elemental iodine. The mol ratio actually used in a polymerization will depend upon the particular components employed in the catalyst system. However, a preferred mol ratio is generally from 1:1 to 12:1 of the organometal compound to the halogen-containing component. When using a catalyst comprising an organometal compound and more than one metal halide, e.g., titanium tetrachloride and titanium tetraiodide, titanium tetrachloride or tetrabromide and aluminum iodide, the mol ratio of the tetrachloride or tetrabromide to the iodide is usually in the range of 0.05:1 to 5:1. With a catalyst system comprising an organometal compound, a titanium chloride or bromide and elemental iodine, the mol ratio of titanium halide to iodine is generally in the range of 10:1 to 0.25:1, preferably 3:1 to 0.25:1. The concentration of the total catalyst composition, i.e., organometal and halogen-containing component, is usually in the range of 0.01 to 10 weight percent, preferably in the range of 0.01 to 5 weight percent, based on the total amount of 1,3-butadiene charged to the reactor system.

The process for preparing cis-polybutadiene can be carried out at temperatures varying over a rather wide range, e.g., from —100 to 250° F. It is usually preferred to operate at a temperature in the range of —30 to 160° F. The polymerization reaction can be carried out under autogenous pressure or at any suitable pressure sufficient to maintain the reaction mixture substantially in the liquid phase. The pressure will thus depend upon the particular diluent employed and the temperature at which the polymerization is conducted. However, higher pressures can employed if desired, these pressures being obtained by some such suitable method as the pressurization of the reactor with a gas which is inert with respect to the polymerization reaction.

The present invention is also applicable to the process for polymerizing 1,3-butadiene with an organolithium compound and to the products obtained by this process. The polybutadienes prepared with an organolithium catalyst generally contain from 35 to 48 percent cis 1,4-addition, from 45 to 55 percent trans 1,4-addition, and from 6 to 10 percent 1,2-addition. The present invention is particularly applicable to low inherent viscosity polybutadienes prepared by this method. Such polymers generally have an inherent viscosity in the range of 0.75 to 3. While the low inherent viscosity polybutadienes possess outstanding properties, they have a tendency to cold flow when in the unvulcanized state.

Organolithium compounds suitable for use in the polymerization have the formula $RLi_x$, wherein R is a hydrocarbon radical selected from the group consisting of aliphatic, cycloaliphatic and aromatic radicals and $x$ is an integer from 1 to 4, inclusive. The R in the formula has a valence equal to the integer and preferably contains from 1 to 20, inclusive, carbon atoms, although higher molecular weight compounds can be utilized. In preparing the polybutadiene, it is often preferred to use an alkyllithium compound, such as n-butyllithium, as the catalyst. Examples of other suitable organolithium compounds include methyllithium, isopropyllithium, tert-octyllithium, n-decyllithium, phenyllithium, naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4 - dilithiocyclohexane, 1,4 - dilithio - 2 - butene, 1,8-dilithio-3-decene, 1,4-dilithiobenzene, 1,5-dilithionaphthalene, 1,2-dilithio-1,2-diphenylethane, 9,10 - dilithio-9,10-dihydroanthracene, 1,2-dilithio-1,8-diphenyloctane, 1,3,5 - trilithiopentane, 1,5,15-trilithioeicosane, 1,3,5-trilithiocyclohexane, 1,2,5 - trilithionaphthalene, 1,3,5 - trilithioanthracene, 1,3,5,8 - tetralithiodecane, 1,5,10,20-tetralithioeicosane, 1,2,3,5 - tetralithiocyclohexane, 1,2,3,5-tetralithio-4-hexylanthracene, and the like.

The process used in preparing the organolithium-catalyzed polybutadiene can be conducted at a temperature in the range of —100 to 250° F., preferably at a temperature in the range of 0 to 180° F. The polymerization reaction can be carried out under autogenous pressures. It is usually desirable to operate at a pressure sufficient to maintain the reaction mixture in the liquid phase. The polymerization is conducted in the presence of a hydrocarbon diluent similar to that employed in the cis-polybutadiene polymerization process as described hereinbefore. The actual pressure used in the process will depend upon the particular diluent employed and the temperature at which the polymerization is to be conducted.

A polybutadiene having a desired inherent viscosity can be readily prepared by varying the concentration of the organolithium compound. For example, with a completely dry system and no other impurities present to destroy the organolithium compound, about 7 millimoles of effective catalyst per 100 grams of monomer is generally required to give a polymer having an inherent viscosity of 0.75, and about 0.25 millimole of effective catalyst per 100 grams of monomer is generally required for the production of a polymer having an inherent viscosity of 3.0. It has been found that for practical operations approximately 0.3 mhm. or more of catalyst is needed as a scavenger for the system.

Various materials are known to be detrimental to the organolithium catalyst and to the catalyst employed in preparing the cis-polybutadiene. These materials include carbon dioxide, oxygen and water. It is usually desirable, therefore, that the butadiene and diluent be freed of these materials as well as other materials which may tend to inactivate the catalyst. Furthermore, it is desirable to remove air and moisture from the reaction vessel in which the polymerization is to be conducted. Upon completion of the polymerization reaction in which the cis-polybutadiene or the organolithium-catalyzed polybutadiene is prepared, the reaction mixture is then treated to inactivate the catalyst and recover the rubbery polymer. As discussed hereinbefore, in accordance with one embodiment of the present invention, the reaction mixture is treated with concentrated sulfuric acid dispersed in a hydrocarbon in order to inactivate the catalyst. After further treatment of the reaction mixture with an alkaline treating agent, the polymer is then recovered by conventional methods. However, it is also within the scope of the invention to add the treating agent of this invention to polymers in which no active polymerization catalyst is present. The polymerization reaction mixture is then first treated by conventional methods to inactivate the catalyst, and the rubbery polymer may also be recovered. A suitable method for accomplishing this result involves steam stripping the diluent from the polymer. In another suitable method, the catalyst-inactivating material, such as an alcohol, is added to the mixture so as to inactivate the catalyst and cause precipitation of the polymer. The polymer is then separated from the alcohol and diluent by any suitable means, such as decantation or filtration. Thereafter, the polymer is treated with the treating agent of this invention as described hereinbefore. It has been found to be advantageous to add an antioxidant, such as 4,4'-methylene-bis-(2,6-di-tert-butylphenol) to the polymer solution prior to recovery of the polymer.

A more comprehensive understanding of the invention may be obtained by referring to the following illustrative examples, which are not intended, however, to be unduly limitative of the invention.

Example I

A polybutadiene having a cis-content of about 95 percent was prepared by the polymerization of 1,3-butadiene in the presence of a catalyst system formed by mixing triisobutylaluminum, titanium tetrachloride, and iodine. The product was gel free, had an inherent viscosity of 2.06, a Mooney value (ML-4 at 212° F.) of 30, and a cold flow value of 8.5 mg./min.

In each of the runs, the polybutadiene was dissolved in toluene. After the temperature of the polymer solution had attained 80° C., a dispersion of concentrated sulfuric acid in toluene was added drop-wise with rapid stirring. The concentrated sulfuric acid used in this and in succeeding examples was a commercial grade acid having a concentration of 95 to 98 percent. Two series of runs were made, one in air and the other in nitrogen, using variable treating periods. The reaction mixtures were cooled to room temperature, washed with water and aqueous ammonia until neutral, coagulated in isopropyl alcohol, and dried. The inherent viscosity, gel, and the cold flow were determined on each of the treated samples. The quantities of materials used, the treating conditions, and the results obtained are shown below in Table I.

The data in Table I show that concentrated sulfuric acid dispersed in a hydrocarbon is an effective agent for reducing the cold flow of cis-polybutadiene.

Example II

The effect of variable quantities of sulfuric acid on the cold flow of cis-polybutadiene was determined at 80° C. and 110° C., using the polymer described in Example I. All runs were carried out in a nitrogen atmosphere and the treating time was 0.5 hour. The data obtained are presented below in Table II.

TABLE II

| Run No. | Parts by Weight | | | Treating Temp., ° C. | Inh. Visc.[2] | Gel,[2] Percent | Cold Flow,[2] mg./min. |
|---|---|---|---|---|---|---|---|
| | Cis-PBd | Toluene | Conc. $H_2SO_4$[1] | | | | |
| 1 | 100 | 600 | 1.0 | 80 | 2.18 | 0 | 7.8 |
| 2 | 100 | 600 | 1.5 | 80 | 2.29 | 0 | 4.1 |
| 3 | 100 | 600 | 2.0 | 80 | 2.29 | 0 | 2.5 |
| 4 | 100 | 600 | 1.0 | 110 | 2.22 | 0 | 6.3 |
| 5 | 100 | 600 | 2.0 | 110 | 2.71 | 4 | 0 |

[1] Dispersed in about 17.2 parts by weight of toluene.
[2] See appropriate footnotes to Table I.

The data in Table II show that a considerable reduction in cold flow was obtained in all cases after a 30-minute treating period. With a given amount of sulfuric acid, a greater reduction in cold flow was obtained at the higher temperature.

Example III

Samples of the cis-polybutadiene described in Example I were dissolved in three different solvents, toluene, benzene, and n-heptane, and treated at 110° C. for 0.5 hour with concentrated sulfuric acid. Tests were carried out in an atmosphere of nitrogen. In each run the acid was dispersed in the same hydrocarbon that was used to dis-

TABLE I

| Run No. | Parts by Weight | | | Atmosphere | Treating Time, Hours | Inh. Visc.[2] | Gel,[3] Percent | Cold Flow,[4] mg./min. |
|---|---|---|---|---|---|---|---|---|
| | Cis-PBd | Toluene | Conc. $H_2SO_4$[1] | | | | | |
| 1 | 100 | 600 | 2.5 | Air | 0.5 | 2.32 | 0 | 2.0 |
| 2 | 100 | 600 | 2.5 | Air | 1 | 2.35 | 0 | 1.3 |
| 3 | 100 | 600 | 2.5 | Air | 2 | 2.55 | 0 | 0 |
| 4 | 100 | 600 | 2.5 | Air | 3 | 2.89 | 1 | 0 |
| 5 | 100 | 600 | 2.5 | Air | 5 | 2.88 | 1 | 0 |
| 6 | 100 | 600 | 2.5 | $N_2$ | 0.5 | 2.58 | 2 | 0 |
| 7 | 100 | 600 | 2.5 | $N_2$ | 1 | 2.74 | 2 | 0 |
| 8 | 100 | 600 | 2.5 | $N_2$ | 2 | 3.24 | 4 | 0 |
| 9 | 100 | 600 | 2.5 | $N_2$ | 3 | 3.16 | 4 | 0 |
| 10 | 100 | 600 | 2.5 | $N_2$ | 5 | 3.21 | 5 | 0 |

[1] Dispersed in 17.2 parts by weight of toluene.
[2] One-tenth gram of polymer was placed in a wire cage made from 80 mesh screen and the cage was placed in 100 ml. of toluene contained in a wide-mouth, 4-ounce bottle. After standing at room temperature (approximately 77° F.) for 24 hours, the cage was removed and the solution was filtered through a sulfur absorption tube of grade C porosity to remove any solid particles present. The resulting solution was run through a Medalia-type viscometer supported in a 77° F. bath. The viscometer was previously calibrated with toluene. The relative viscosity is the ratio of the voscosity of the polymer solution to that of toluene. The inherent viscosity is calculated by dividing the natural logarithm of the relative viscosity by the weight of the original sample.
[3] Determination of gel was made along with the inherent viscosity determination. The wire cage was calibrated for toluene retention in order to correct the weight of swelled gel and to determine accurately the weight of dry gel. The empty cage was immersed in toluene and then allowed to drain three minutes in a closed widemouth, 2-ounce bottle. A piece of folded quarter-inch hardware cloth in the bottom of the bottle supported the cage with minimum contact. The bottle containing the cage was weighed to the nearest 0.02 gram during a minimum 3-minute draining period after which the cage was withdrawn and the bottle again weighed to the nearest 0.02 gram. The difference in the two weighings is the weight of the cage plus the toluene retained by it, and by subtracting the weight of the empty cage from this value the weight of toluene retention is found, i.e., the cage calibration. In the gel determination after the cage containing the sample had stood for 24 hours in toluene, the cage was withdrawn from the bottle with the aid of forceps and placed in the 2-ounce bottle. The same procedure was followed for determining the weight of swelled gel as was used for calibration of the cage. The weight of swelled gel was corrected by subtracting the cage calibration.
[4] Cold flow was measured by extruding the rubber through a ¼-inch orifice at 3.5 p.s.i. pressure and a temperature of 50° C. (122° F.). After allowing 10 minutes to reach steady state, the rate of extrusion was measured and the values reported in milligrams per minute. All of the cold flow values referred to in the examples were determined by this method.

solve the polymer. The results obtained in the runs are shown below in Table III.

TABLE III

| Run No. | Solvent Used | Parts by Weight | | | Inh. Visc.[2] | Gel,[2] Percent | Cold Flow,[2] mg./min. |
|---|---|---|---|---|---|---|---|
| | | Cis-PBd | Solvent | Conc. $H_2SO_4$ [1] | | | |
| 1 | Toluene | 100 | 600 | [3] 2 | 2.71 | 4 | 0 |
| 2 | Benzene | 100 | 600 | [4] 2 | 3.03 | 4 | 0 |
| 3 | n-Heptane | 100 | 600 | [5] 2 | 2.33 | 3 | 2.2 |

[1] Equal volumes of toluene, benzene, and n-heptane used as dispersants.
[2] See appropriate footnotes to Table I.
[3] Dispersed in about 17.2 parts by weight of toluene.
[4] Dispersed in about 17.8 parts by weight of benzene.
[5] Dispersed in about 13.6 parts by weight of n-heptane.

*Example IV*

A polybutadiene was prepared by the polymerization of 1,3-butadiene in the presence of n-butyllithium as the catalyst. This polymer had a cold flow value of 15.7. One hundred parts by weight of the polymer was dissolved in 600 parts by weight of toluene and the solution was treated with 2 parts by weight of concentrated sulfuric acid dispersed in toluene, using the procedure employed in the foregoing examples. The run was carried out in a nitrogen atmosphere at 110° C. for 30 minutes. The cold flow of the treated product was zero.

Infrared analyses of various sulfuric acid treated samples showed no change in structure resulting from the treatment.

*Example V*

Two runs were carried out in which cis-polybutadiene was treated with sulfuric acid. The cis-polybutadiene was prepared by polymerizing polybutadiene with a catalyst consisting of triisobutylaluminum, titanium tetrachloride, and iodine. The polybutadiene had a cis-content of about 95 percent and a cold flow value of 9.3. In the first run conducted according to the present invention, concentrated sulfuric acid was dispersed in toluene, and the dispersion was added drop-wise with rapid stirring to a solution of the polybutadiene. The second run was a control run in which concentrated sulfuric acid was dissolved in water. The dilute sulfuric acid was added to a solution of the polybutadiene in a manner similar to that described above. The time required for the addition in both runs was about 2 minutes and the stirring was continued for 2 hours. The temperature was maintained at 80° C. throughout the runs, and the runs were carried out in an atmosphere of air. At the end of two hours, the reaction mixtures were cooled to room temperature, washed with water and aqueous ammonia until neutral, coagulated in isopropyl alcohol, and dried. A summary of the runs together with certain properties of the polymers is shown below in Table IV.

TABLE IV

| | Parts by Weight, Runs | |
|---|---|---|
| | 1 | 2 |
| Acid Treating Agent: | | |
| Sulfuric Acid | 2.5 | 2.5 |
| Toluene [1] | 17.2 | |
| Water [1] | | 20 |
| Polymer Solution: | | |
| Cis-polybutadiene | 100 | 100 |
| Toluene | 600 | 600 |
| Cold Flow, mg./min.[2] | 0 | 9.2 |

[1] Equal volumes of toluene and water used.
[2] See footnote 4 of Table I.

These data show that the treating agent of this invention reduced the cold flow of polymer to zero. On the other hand, the concentrated sulfuric acid when dissolved in water was ineffective in reducing the cold flow of the polymer, the value before and after treatment being substantially the same.

As will be evident to those skilled in the art, many variations and modifications of the invention can be practiced in view of the foregoing disclosure. Such variations and modifications are believed to come within the spirit and scope of the invention.

I claim:

1. A method for reducing the tendency of polybutadiene to cold flow when in the unvulcanized state which comprises the steps of dispersing from 0.2 to 5 parts by weight of a reagent consisting essentially of about 90–98 percent concentrated sulfuric acid into a sufficient amount of a hydrocarbon to provide a dispersion having a concentration of 1 to 25 weight percent sulfuric acid in the hydrocarbon and adding said dispersion to a solution comprising 100 parts by weight of said polybutadiene dissolved in a hydrocarbon; rapidly stirring the resulting mixture; adding an alkaline material to said mixture in order to neutralize said sulfuric acid; and recovering a polybutadiene having a reduced tendency to cold flow.

2. A method for reducing the tendency of a polybutadiene to cold flow which comprises the steps of dissolving in a hydrocarbon 100 parts by weight of a polybutadiene selected from the group consisting of cis-polybutadiene containing at least 85 percent cis-1,4 addition and organolithium catalyzed polybutadiene; dispersing 0.2 to 5 parts by weight of a reagent consisting essentially of about 90–98 percent concentrated sulfuric acid into a sufficient amount of a hydrocarbon to provide a dispersion having a concentration of 1 to 25 weight percent sulfuric acid in the hydrocarbon; adding the resulting dispersion to the said polybutadiene; rapidly stirring the resulting mixture; adding an alkaline material to said mixture in order to neutralize said sulfuric acid; and recovering a polybutadiene having a reduced tendency to cold flow.

3. In a polymerization process in which 1,3-butadiene is polymerized with a catalyst selected from the group consisting of: (1) an iodine-containing catalyst which includes an organometal and a titanium halide, and (2) an organolithium compound in the presence of a hydrocarbon diluent, the improvement which comprises the steps of dispersing from 0.2 to 5 parts by weight of a reagent consisting essentially of about 90–98 percent concentrated sulfuric acid into a sufficient amount of a hydrocarbon to provide a dispersion having a concentration of 1 to 25 weight percent sulfuric acid in the hydrocarbon; and adding the said dispersion to the polymerization mixture comprising 100 parts by weight of 1,3-polybutadiene; rapidly stirring the resulting mixture; adding an alkaline material to said mixture in order to neutralize said sulfuric acid whereby the 1,3-butadiene polymer has a reduced tendency to cold flow.

4. In a polymerization process in which 1,3-butadiene is polymerized with a catalyst selected from the group consisting of: (1) an iodine-containing catalyst which includes an organometal and a titanium halide and (2) an organolithium compound, in the presence of a hydrocarbon diluent, the improvement which comprises the steps of dispersing from 0.2 to 5 parts by weight of a reagent consisting essentially of about 90–98 percent concentrated sulfuric acid into a sufficient amount of a hydrocarbon to provide a dispersion having a concentration of 1 to 25 weight percent sulfuric acid in the hydrocarbon; adding this said dispersion to the polymerization mixture comprising 100 parts by weight of 1,3-polybutadiene; rapidly stirring the resulting mixture; adding to said resulting mixture an alkaline material in order to neutralize said acid; and recovering a polybutadiene having a reduced tendency to cold flow.

5. The method according to claim 2 in which said polybutadiene is a cis-polybutadiene containing at least 85 percent cis 1,4-addition.

6. The method according to claim 2 in which said polybutadiene is an organolithium-catalyzed polybutadiene.

7. The method according to claim 4 in which said hydrocarbons are aromatic hydrocarbons.

References Cited by the Examiner

UNITED STATES PATENTS 3,062,802  11/1962  Cunneen et al. _____ 260—94.7

FOREIGN PATENTS 36,073  8/1947  India.

OTHER REFERENCES

Indian patent specification 36,074, August 21, 1947 (4 pp. specification).

JOSEPH L. SCHOFER, *Primary Examiner.*

LEON J. BERCOVITZ, JAMES A. SEIDLECK,
*Examiners.*

C. R. REAP, W. HOOVER, *Assistant Examiners.*